G. A. LYON.
BUFFER ATTACHING DEVICE.
APPLICATION FILED MAR. 27, 1922.
1,436,993. Patented Nov. 28, 1922.
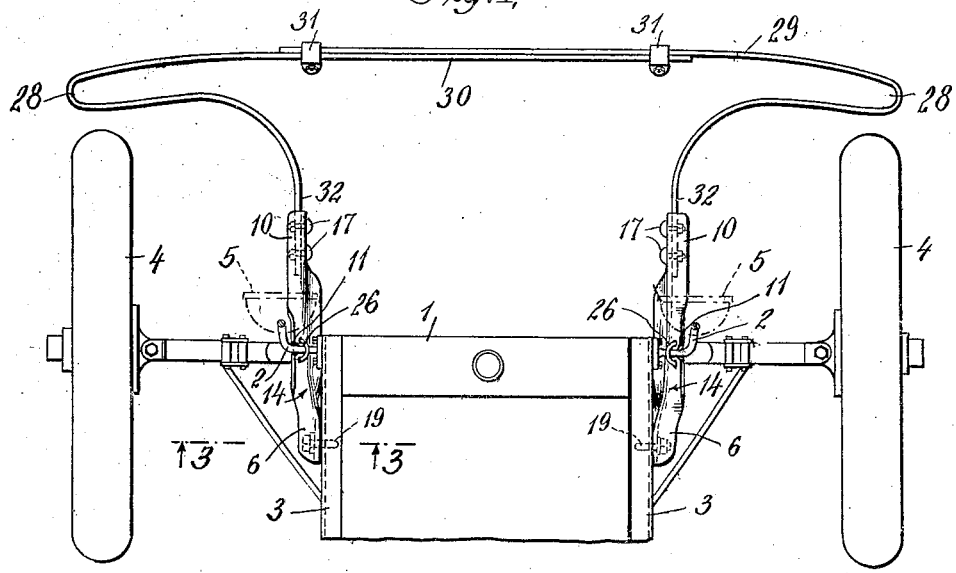
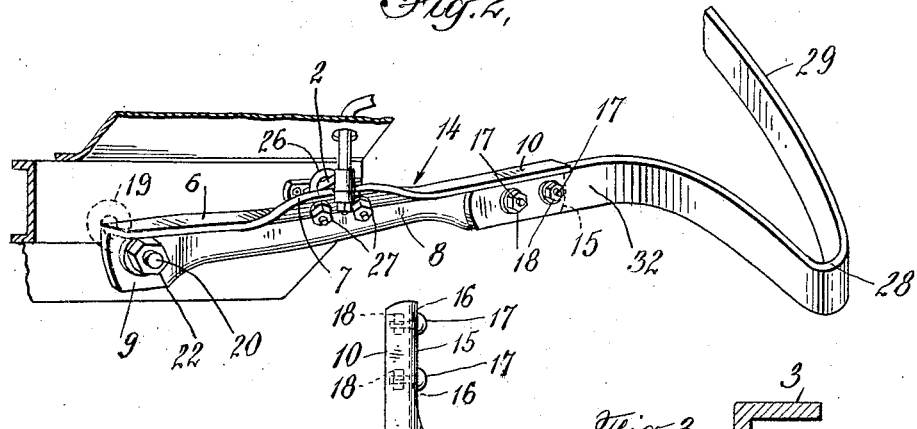
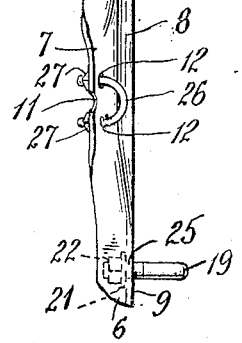
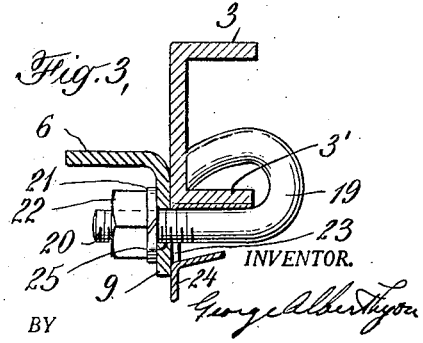
INVENTOR.
George Albert Lyon
BY
Harry L. Duncan
ATTORNEY.

Patented Nov. 28, 1922.

1,436,993

UNITED STATES PATENT OFFICE.

GEORGE ALBERT LYON, OF PHILADELPHIA, PENNSYLVANIA.

BUFFER-ATTACHING DEVICE.

Application filed March 27, 1922. Serial No. 547,325.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Buffer-Attaching Devices, of which the following is a specification, taken in connection with the accompanying drawing.

This invention relates especially to buffer attaching devices adapted to attach Lyon or other type buffers to Ford automobiles. The attachment comprises extensions supporting brackets formed of forged sheet steel or other suitable material and, if desired, hardened and tempered to give greater stiffness and strength with lighter weight. The brackets are also formed with angular or flanged stiffening portions throughout their length and a buffer aligning flange may be formed on the front end of each bracket against which the edge of the spring strip or other buffer attaching member may be clamped or connected as by one or more connecting bolts passing through these parts. The rear attaching end of the bracket may have a hook bolt attacher of any suitable construction cooperating therewith to lock around the frame flange and clamp the contact face of the bracket against the frame web while the mid-portion of the bracket may have on its upper face an obliquely bent clamping flange adapted to engage the lamp bracket and be clamped thereto by a U-bolt clamping device passing through the flange and around the lamp bracket so as to rigidly hold the supporting bracket to the automobile at this point considerably ahead of the hook bolt connection.

In the accompanying drawing which shows in a somewhat diagrammatic manner an illustrative embodiment of this invention—

Fig. 1 is a plan view showing the brackets in place and supporting a bumper on an automobile.

Fig. 2 is a side perspective view on a larger scale.

Fig. 3 is an enlarged vertical section through the attaching end of the bracket taken along the line 3—3 of Fig. 1, and Fig. 4 is a top view of the bracket disconnected from the other parts.

For convenience the bracket is shown as supporting a spring strip buffer of the Lyon type on a Ford automobile, although, of course, the device is adapted to be used with other types and styles of buffers which preferably have rearwardly extending spring strip or other attaching members. As shown in Figs. 1 and 2, the illustrative buffer may comprise the spring strip attaching members 32, each curving outward to form the end loop 28 and then being brought inward to form the cooperating front or impact receiving members 29, 30 which may be adjustably or otherwise connected in overlapping or reenforcing position as by the clips or clamping devices 31 so that the end loops extend into protective position adjacent the front wheels 4 of the vehicle as well as protecting the radiator 1, lamps 5, and other parts.

The extension supporting brackets are preferably formed of steel strip or sheet $\frac{3}{16}$ of an inch thick more or less and, if desired, still greater strength can be secured with the same weight by hardening and tempering the brackets after they have been formed and bent into the desired shape. The front end of each bracket may be formed with one or more buffer aligning flanges such as 10 which may extend on the top of the bracket outward sufficiently to cover the attaching ends 32 of the buffer and also, if desired, the connector bolts or devices 17 which may extend through suitable holes or slots 16 in the attaching members and in the cooperating substantially vertical face 15 of this part of the bracket. Of course by tightening the nuts 18 on these bolts after the brackets are in place the connected buffer member may be rigidly secured to the bracket. Adjacent the central part of the bracket the upper flange or edge is preferably bent upward at an oblique angle so as to form the clamping flange 7 adapted to extend beneath the Ford lamp bracket 2 to which it may be clamped or secured as by the U-bolt clamping device 26 when the nuts 27 are tightened on the shanks of the bolt which extend through holes 12 in this flange. This clamping flange also preferably has an aligning notch 11 formed therein and adapted to fit against the lamp support or bracket so as to definitely align the supporting bracket with respect thereto and secure a still more rigid and strong connection with the automobile.

The rear or attaching end of the supporting bracket is preferably formed with a substantially flat or horizontal stiffening flange 6 and with a depending flange or contact face 9 of considerable vertical extent formed adjacent its lower portion with a bolt hole 25 through which the threaded shank 20 of any suitable hook bolt attacher may extend. The bent hook end 19 of this hook bolt may be so formed as to extend around the lower flange 3' of the automobile frame and have a contact end engaging either the inner face of the flange or the frame web or both so that when the tightening nut 22 is screwed home firm wedging contact may take place at the bend of the hook and the contact face of the bracket may thus be forced strongly into holding engagement with the frame web, a lock washer 21 being provided beneath the nut 22 if desired. In some types of construction the depending edge 24 of the splash pan may be cut or perforated sufficiently to admit the shank of the hook bolt which is preferably put in place after the supporting bracket has been clamped by the U-bolt in at least substantially its permanent position. The hook bolt may then be firmly tightened and a strong and rigid connection is thus secured with the automobile frame at two sufficiently separated points so that the buffer is amply supported under both running and collision conditions. As indicated in Fig. 4, the middle and also the rear portion of the supporting bracket, if desired, may be substantially straight on their inner face which cooperates with the automobile frame while the forward end of the supporting bracket may in some cases extend outward somewhat so that its vertical or contact face 15 is somewhat further separated from the cooperating bracket at this point. This outwardly bent portion may also in some cases be carried back adjacent the top of the supporting bracket to a point 14 close to the rear attaching end of the bracket as shown in Fig. 1 although this is not necessary in all cases.

The brackets may have the bolts and connecting devices loosely connected thereto so that when shipped out each bracket may be arranged about as shown in Fig. 4 and each of these devices may of course be quickly and securely put in place by the ordinary garage man or car owner when necessary.

This invention has been described in connection with a number of embodiments, forms, proportions, parts, arrangements, materials, methods of connection and use, to the details of which disclosure the invention is not of course to be limited since what is claimed as new and what is desired to be secured by Letters Patent is set forth in the appended claims:

1. In automobile buffers a spring strip buffer having rearwardly extending attaching members and connected end loops, a pair of sheet steel supporting brackets each having adjacent its front end an upper buffer aligning flange and cooperating connecting bolts extending through the substantially vertical contact face of the bracket to clamp the buffer attaching member thereto, a diagonally bent clamping flange formed adjacent the centre of each bracket and adapted to cooperate with the lamp bracket of a Ford automobile and formed with an aligning notch in its edge to engage the lamp bracket and longitudinally align the supporting bracket in connection therewith, a U-bolt clamping device extending through said clamping flange and adapted to be clamped around the lamp bracket and a flanged rear attaching end formed on said supporting bracket and having an apertured vertical contact face through which the shank of a hook bolt attacher extends to lock around the frame flange and clamp said contact face against the same.

2. In automobile buffers a spring strip buffer having rearwardly extending attaching members and connected end loops, a pair of sheet steel supporting brackets each having adjacent its front end a buffer aligning flange and cooperating connecting bolt extending through the bracket to clamp the buffer attaching member thereto, a diagonally bent clamping flange formed adjacent the centre of each bracket and adapted to cooperate with the lamp bracket of a Ford automobile, a U-bolt clamping device extending through said clamping flange and adapted to be clamped around the lamp bracket and a flanged rear attaching end formed on said supporting bracket and having an apertured vertical contact face through which the shank of a hook bolt attacher extends to lock around the frame flange and clamp said contact face against the same.

3. In automobile buffers a spring strip buffer having rearwardly extending attaching members and connected end loops, a pair of sheet steel supporting brackets each having adjacent its front end a buffer aligning flange and cooperating connecting bolt extending through the bracket to clamp the buffer attaching member thereto, a diagonally bent clamping flange formed adjacent the centre of each bracket and adapted to cooperate with the lamp bracket of a Ford automobile, a clamping device cooperating with said clamping flange and adapted to be clamped around the lamp bracket and a rear attaching end formed on said supporting bracket and having an apertured vertical contact face through which the shank of a hook bolt attacher extends to lock around the frame flange and clamp said contact face against the same.

4. In automobile buffers a Lyon type spring strip buffer having rearwardly extending attaching members and connected end loops, a pair of forged steel supporting brackets each having adjacent its front end connecting means to clamp the buffer attaching member thereto, a notched diagonally bent clamping flange formed adjacent the centre of each bracket and adapted to cooperate with the lamp bracket of a Ford automobile and be secured thereto and a rear attaching end formed on said supporting bracket and having an apertured contact face through which the shank of a securing bolt extends to clamp said contact face against the frame.

5. In automobile buffers a buffer having rearwardly extending attaching members and connected end loops, a pair of forged steel supporting brackets each having adjacent its front end connecting means to clamp the buffer attaching member thereto, a diagonally bent clamping flange formed adjacent the centre of each bracket and adapted to cooperate with the lamp bracket of a Ford automobile and be secured thereto and a rear attaching end formed on said supporting bracket and having a contact face to be clamped against the frame.

6. In automobile buffer attaching devices, a pair of sheet steel supporting brackets each having adjacent its front end an aligning member and cooperating connecting bolts extending through the substantially vertical contact face of the bracket and adapted to clamp the buffer attaching member thereto, a diagonally bent clamping flange formed adjacent the centre of each bracket and adapted to cooperate with the lamp bracket of a Ford automobile and formed with an aligning notch in its edge to engage the lamp bracket and longitudinally align the supporting bracket in connection therewith, a U-bolt clamping device extending through said clamping flange and adapted to be clamped around the lamp bracket and a flanged rear attaching end formed on said supporting bracket and having an apertured vertical contact face through which the shank of a hook bolt attacher extends to lock around the frame flange and clamp said contact face against the frame.

7. In automobile buffer attaching devices, a pair of sheet steel supporting brackets each having adjacent its front end an aligning member and cooperating connecting bolts extending through the substantially vertical contact face of the bracket and adapted to clamp the buffer attaching member thereto, a diagonally bent clamping flange formed adjacent the centre of each bracket and adapted to cooperate with the lamp bracket of a Ford automobile, a U-bolt clamping device extending through said clamping flange and adapted to be clamped around the lamp bracket and a flanged rear attaching end formed on said supporting bracket and having an apertured vertical contact face through which the shank of a bolt extends to clamp said contact face against the frame.

8. In automobile buffer attaching devices, a pair of sheet steel supporting brackets each having adjacent its front end an aligning member and cooperating connecting bolts adapted to clamp the buffer attaching member thereto, a clamping flange formed adjacent the centre of each bracket and adapted to cooperate with the lamp bracket of a Ford automobile, a clamping device cooperating with said clamping flange and adapted to be clamped around the lamp bracket and a flanged rear attaching end formed on said supporting bracket and having an apertured vertical contact face through which the shank of a bolt extends to clamp said contact face against the frame.

9. In automobile buffer attaching devices, a supporting bracket having adjacent its front end an upper buffer aligning flange and connecting bolt holes extending through the substantially vertical contact face of the bracket to clamp the buffer attaching member thereto, a diagonally bent clamping flange formed adjacent the centre of the bracket and adapted to cooperate with and be clamped to the lamp bracket of a Ford automobile and formed with an aligning notch in its edge to engage the lamp bracket and longitudinally align the supporting bracket in connection therewith, and a flanged rear attaching end formed on said supporting bracket and having an apertured vertical contact face through which the shank of a hook bolt attacher is adapted to extend to lock around the frame flange and clamp said contact face against the same.

10. In automobile buffer attaching devices, a forged steel supporting bracket having adjacent its front end connecting bolt holes extending through the substantially vertical contact face of the bracket to clamp the buffer attaching member thereto, a diagonally bent clamping flange formed adjacent the centre of the bracket and adapted to cooperate with and be clamped to the lamp bracket of a Ford automobile and a rear attaching end formed on said supporting bracket and having an apertured vertical contact face through which the shank of a hook bolt attacher is adapted to extend to lock around the frame flange and clamp said contact face against the same.

GEORGE ALBERT LYON.